US008910854B2

(12) United States Patent
Southwell et al.

(10) Patent No.: US 8,910,854 B2
(45) Date of Patent: Dec. 16, 2014

(54) CONTAINER HAVING REINFORCING LINERBOARD AND METHODS OF MAKING THE SAME

(75) Inventors: James D. Southwell, Long Grove, IL (US); Benjamin Frank, Buffalo Grove, IL (US); Keith A. Jackson, Gurnee, IL (US)

(73) Assignee: Packaging Corporation of America, Lake Forest, IL (US)

(*) Notice: Subject to any disclaimer, the term of this patent is extended or adjusted under 35 U.S.C. 154(b) by 511 days.

(21) Appl. No.: 12/719,172

(22) Filed: Mar. 8, 2010

(65) Prior Publication Data

US 2010/0230480 A1 Sep. 16, 2010

Related U.S. Application Data

(60) Provisional application No. 61/159,291, filed on Mar. 11, 2009.

(51) Int. Cl.

| | |
|---|---|
| ***B65D 3/22*** | (2006.01) |
| ***B29C 53/36*** | (2006.01) |
| ***B65D 5/02*** | (2006.01) |
| ***B65D 5/44*** | (2006.01) |

(52) U.S. Cl.

CPC ............. *B65D 5/029* (2013.01); *B31B 2201/26* (2013.01); *B65D 5/445* (2013.01); *B65D 5/443* (2013.01)

USPC ....................... 229/122.32; 229/199; 156/218

(58) Field of Classification Search

CPC .... Y10S 229/939; B32B 29/08; B65D 5/566; B65D 2519/00273; B65D 5/445

USPC ................................. 229/108, 122.27, 199.1

See application file for complete search history.

(56) References Cited

U.S. PATENT DOCUMENTS

| | | | | |
|---|---|---|---|---|
| 3,653,578 | A | 4/1972 | Wood | |
| 3,744,702 | A * | 7/1973 | Ellison | 229/122.32 |
| 3,955,746 | A | 5/1976 | Engman | |
| 4,059,220 | A | 11/1977 | Lorenz | |
| 4,089,417 | A | 5/1978 | Osborne | |
| 4,392,606 | A | 7/1983 | Fremion | |
| 4,655,366 | A | 4/1987 | Sykes | |
| 4,702,408 | A * | 10/1987 | Powlenko | 229/101 |
| 4,718,597 | A | 1/1988 | Bishop | |
| 4,804,138 | A | 2/1989 | McFarland | |
| 4,865,201 | A | 9/1989 | Liebel | |
| 5,163,555 | A | 11/1992 | West et al. | |
| 5,285,957 | A | 2/1994 | Halsell | |
| 5,351,849 | A | 10/1994 | Jagenburg et al. | |
| 5,447,270 | A | 9/1995 | McNown | |
| 5,632,404 | A | 5/1997 | Walsh | |
| 5,702,052 | A | 12/1997 | Bonner | |
| 5,921,465 | A | 7/1999 | Garton | |
| 6,667,092 | B1 * | 12/2003 | Brollier et al. | 428/182 |
| 7,229,003 | B2 | 6/2007 | Grigsby et al. | |
| 7,368,159 | B2 * | 5/2008 | Smith et al. | 428/182 |
| 2006/0255109 | A1 * | 11/2006 | Green | 229/125.04 |
| 2008/0116249 | A1 * | 5/2008 | West | 229/109 |

* cited by examiner

*Primary Examiner* — Christopher Demeree

(74) *Attorney, Agent, or Firm* — Nixon Peobody LLP

(57) ABSTRACT

A container is disclosed. The container comprises a side portion including a plurality of side panels. The container further comprises a bottom portion including a plurality of bottom panels. Each of the plurality of bottom panels extend from a respective one of the plurality of sides. The container includes a first linerboard, a second linerboard, at least one corrugated medium positioned between the first and second linerboards, and at least one additional linerboard being coupled to at least a portion of the first linerboard.

17 Claims, 2 Drawing Sheets

CONTAINER HAVING REINFORCING LINERBOARD AND METHODS OF MAKING THE SAME

CROSS-REFERENCE TO RELATED APPLICATION

This application claims the benefit of U.S. Provisional Application No. 61/159,291, filed Mar. 11, 2009, which is hereby incorporated by reference in their entirety.

FIELD OF THE INVENTION

The present invention relates generally to containers for containing and protecting goods during shipment and methods for making such containers. In particular, the present invention relates to a shipping container having an additional, reinforcing linerboard attached thereto.

BACKGROUND OF THE INVENTION

Corrugated fiberboard containers have been used for many years as shipping and storage containers for a large variety of products. Corrugated fiberboard generally refers to a multilayer sheet material comprised of sheets of linerboard bonded to central corrugated layers of medium. Single-wall corrugated fiberboard involves two sheets of linerboard bonded on alternate sides of one corrugated medium while double-wall corrugated fiberboard involves three linerboards bonded alternatively to two corrugated mediums. Corrugated fiberboard containers may vary greatly in size and weight depending on the intended usage of the container.

The distribution of products in large containers is common in a wide variety of industries, ranging from automotive to food. Corrugated semi-bulk containers ("CBCs") and "combo bins" are examples of containers common in the meat industry for storing and shipping beef, pork, chicken, other animal products, and/or animal protein products between processing facilities and from those processing facilities to customers.

Existing CBCs and combo bins often require local horizontal zones of reinforcement for containment to prevent container failure resulting in product loss and to ensure the products are saleable when they arrive at the end of the distribution process and any auxiliary processes. Given the dense, flowable, and frequently "wet" nature of the products often shipped in the CBCs and combo bins, containment of the product in a thin-gauge plastic bag within a paper-based, economical, single-use container is often challenging.

A single container failure may result in a loss costing several times more than the cost of the contents of the container, For example, all of the contents on a truck may be rejected if just one of the containers being shipped on the truck fails. The product contained therein may then be lost due to perishability. Other losses resulting therefrom may also be accrued such as penalties, consequential losses, combinations thereof, and the like.

Reinforcement methods are often used to increase the performance of existing CBCs and combo bins. For example, some existing CBCs and combo bins are constructed of multiwall combinations to increase the strength of the containers. Moreover, existing CBCs and combo bins may utilize heavy linerboards to assist in preventing leakage of the product being shipped.

Alternatively or additionally, existing CBCs and combo bins may utilize embedded filament-reinforcing tapes, internal reinforcement, and/or externally applied tensioned strapping. Internal reinforcement may include polymeric straps located between one of the sheets of linerboard and one of the corrugated mediums to enhance the bulge or tear resistance of the structure, thereby increasing the performance of the overall container. External reinforcement is most often accomplished by the use of multiple horizontal bands of strapping material. These reinforcements generally reinforce the container and protect against static hydraulic forces and dynamic forces resulting from transportation and handling.

Existing reinforcement methods have several disadvantages associated therewith. For example, existing reinforcements are often costly to purchase and to apply to the containers. The process of adding reinforcements to containers often requires significant manual labor. Furthermore, the placement and/or tension levels often vary, depending, for example, on the operator. Although the process may be automated on a conveyor, extensive capital expense and a dedicated manufacturing line are often required to do so. Additionally, because the reinforcements are often polymeric, metallic, or the like, the reinforcements are more difficult to recycle and generally have a greater negative impact to the environment than a fiberboard container alone.

Thus, a container that addresses one or more of the above-described disadvantages would be desirable.

SUMMARY OF THE INVENTION

According to one embodiment of the present invention, a container is disclosed. The container comprises a side portion including a plurality of side panels. The container further comprises a bottom portion including a plurality of bottom panels. Each of the plurality of bottom panels extend from a respective one of the plurality of sides. The container includes a first linerboard, a second linerboard, at least one corrugated medium positioned between the first and second linerboards, and at least one additional linerboard being coupled to at least a portion of the first linerboard.

According to one process of the present invention, a method of forming a container is disclosed. The method comprises the act of providing a container blank including a side portion having a plurality of side panels. The plurality of side panels have a plurality of bottom panels extending therefrom. The container blank includes a first linerboard, a second linerboard, and a corrugated medium positioned between the first and second linerboards. The method further comprises the act of bonding a third linerboard to at least a portion of one of the first and second linerboards. The method further comprises the act of adhering a first end of the side portion to a second, opposing end of the side portion. The method further comprises the act of folding the plurality of bottom panels along fold lines, the fold lines separating the plurality of bottom panels from the plurality of side panels. The method further comprises the act of securing the plurality of bottom panels in a folded position to form a bottom portion of the container.

According to another embodiment of the present invention, a container is disclosed. The container comprises a side portion including a plurality of side panels. The container further comprises a bottom portion including a plurality of bottom panels extending from a respective one of the plurality of sides. The container includes a first linerboard, a second linerboard, at least one corrugated medium positioned between the first and second linerboards, and a third linerboard bonded to one of the first and second linerboards. The third linerboard extends from the side portion to the bottom portion.

The above summary of the present invention is not intended to represent each embodiment or every aspect of the present invention. This is the purpose of the figures and the detailed description which follow.

BRIEF DESCRIPTION OF THE DRAWINGS

Other advantages of the invention will become apparent upon reading the following detailed description and upon reference to the drawings in which.

Figure 1:
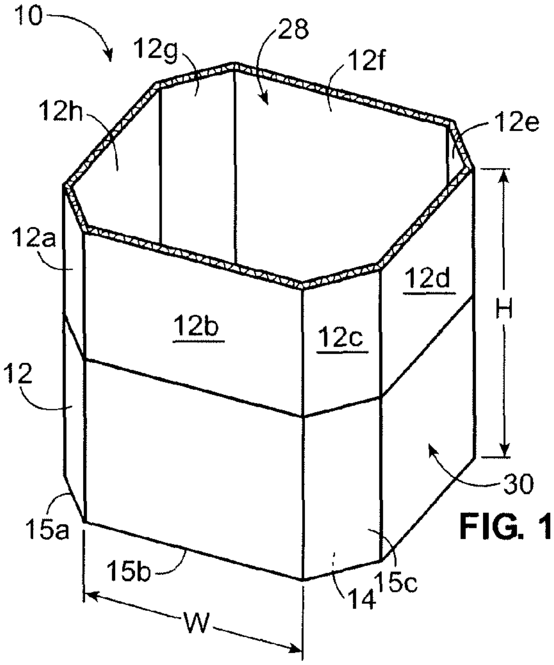
FIG. 1 is an isometric view of a container according to one embodiment of the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF THE INVENTION

Turning now to FIG. 1, a container 10 according to one embodiment of the present invention is shown. The container 10 is configured to hold contents being transported from a first location to a second location. The container 10 has a side portion 12 and a bottom portion 14. The side portion 12 and the bottom portion 14 may be formed of corrugated fiberboard.

In the illustrated embodiment of FIG. 1, the container 10 has an octagonal shape. Thus, the container 10 includes eight sides 12*a-h*, and the bottom portion 14 includes eight sides 15*a-h* (15*d-h* not shown). It is contemplated, however, that the container 10 may have any suitable shape such as rectangular, square, hexagonal, or other polygonal shapes. It is also contemplated that the width W of the sides 12*a-h*, 15*a-h* may vary.

Figure 2:
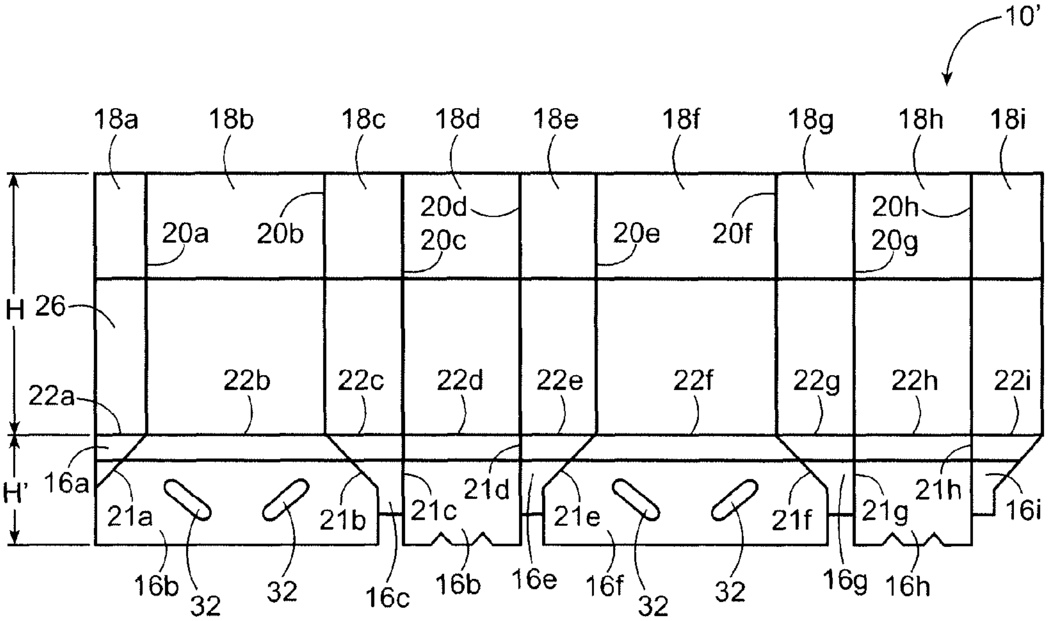
FIG. 2 is a plan view of a blank for forming the container of FIG. 1.

Turning now to FIG. 2, a plan view of a container blank 10' for the formation of the container 10 of FIG. 1 is shown. Referring to FIG. 2, the container blank 10' includes nine bottom panels 16*a-i* extending from and integrated with each of nine side panels 18*a-i*. The nine side panels 18*a-i* include diagonal side panels 18*a*, 18*c*, 18*e*, 18*g*, 18*i*, a front and back side panel 18*b*, 18*f*, and a left and right side panel 18*d*, 18*g*. In the illustrated embodiment, the diagonal side panels 18*a*, 18*c*, 18*e*, 18*g*, 18*i*, the front and back side panels 18*b*, 18*f*, and the left and right side panels 18*d*, 18*g* have different widths. In other embodiments, however, the diagonal side panels, the front and back side panels, and the left and right side panels may all have the same widths or two or more of the same may have the same width. The side panels 18*a-i* are separated from one another by respective fold lines 20*a-h*. When the container 10 is assembled (FIG. 1), the side panels 18*a*, 18*i* at least partially overlap such that they may be readily adhered to one another.

The nine bottom panels 16*a-i* include diagonal bottom panels 16*a*, 16*c*, 16*e*, 16*g*, 16*i*, a front and back bottom panel 16*b*, 16*f*, and a left and right bottom panel 16*d*, 16*h*. The bottom panels 16*a-i* are separated from one another by respective cut lines 21*a-h*. The bottom panels 16*a-i* are separated from the respective side panels 18*a-i* by respective fold lines 22*a-i*.

Figure 3A:
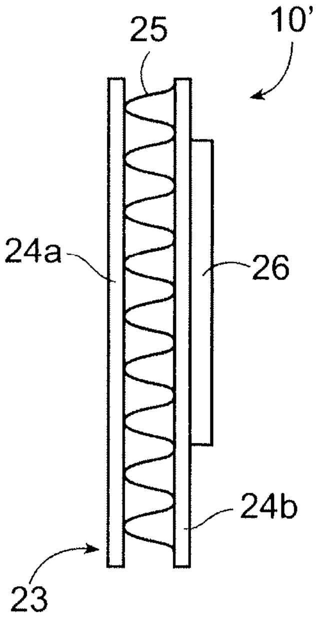
FIG. 3*a* is a side view of the blank of FIG. 2.

Turning now to FIG. 3*a*, a side view of the container blank 10' of FIG. 2 is shown. The container blank 10' is made of a single-wall corrugated fiberboard 23. The single-wall corrugated fiberboard 23 includes a first sheet of linerboard 24*a* and second sheet of linerboard 24*b* bonded on opposing sides of a corrugated medium 25. The first and second linerboards 24*a*, 24*b* serve as primary facings (i.e., an internal facing and an external facing) of the resulting container 10 (FIG. 1). Additionally, the container blank 10' includes a partial-height third linerboard 26 bonded to the second sheet linerboard 24*b*.

The height, dimensions, and placement of the third linerboard 26 on the first or second linerboard 24*a*, 24*b* may vary. For example, the third linerboard 26 may be sized such that it covers the entire height H or a portion thereof of the container 10 (see FIG. 1). The height and placement of the third linerboard 26 will typically be determined by the need to reinforce at least the lower portion of the height H of the container 10. Although not necessary, the third linerboard 26 may also extend beyond the fold lines 22*a-i*, overlapping at least a portion of the height H' of the bottom panels 16*a-i* of the container blank 10', as shown in FIG. 2. Applying the third linerboard 26 to at least a portion of the bottom panels 16*a-i* may be desirable for convenience, increasing locational tolerances, and reinforcing the bottom portion 14 of the container 10. It is also contemplated that third linerboard 26 may be comprised of more than one piece of linerboard.

The third linerboard 26 may be formed of any suitable material including, but not limited to, fiber materials formed from wood, non-wood materials, or a combination thereof. It may be desirable, for example, for the third linerboard 26 to be formed of a material suitable for application on-corrugator. In some embodiments, the third linerboard is formed from a non-wood fiber material such as spunbonded olefin material such as, for example, Tyvek® (DuPont™, Wilmington, Del.).

The third linerboard 26 may be fully or partially laminated to one of the primary facings of the container blank 10'. For example, if the third linerboard 26 is to be invisible, to provide additional protection and life-extension in case a plastic bag/barrier located within the container 10 leaks or breaks, or the like, the third linerboard 26 may be bonded to the internal facing (see internal facing 28 of FIG. 1) of the container 10. The third linerboard 26 may also or alternatively be bonded to an external facing 30 of the container 10, as in FIG. 1, to protect against abrasion of the container 10 or the like. It is also contemplated that a third linerboard may be bonded to an internal facing and a fourth linerboard may be bonded to an external facing of the container 10. It is further contemplated that an additional linerboard(s) may be bonded to the first, second, and/or third linerboards 24*a*, 24*b*, 26, depending upon the desired structural integrity of the resulting container.

Figure 3B:
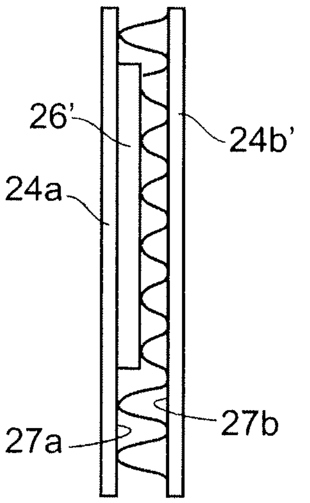
FIG. 3*b* is a side view of a blank according to another embodiment.

According to another embodiment, the third linerboard 26 is positioned between an inside surface of one of the first and second linerboards 24*a*, 24*b* and the corrugated medium 25. Referring to FIG. 3*b*, for example, a third linerboard 26' is bonded to an inside surface 27*a* of a first linerboard 24*a'*. The third linerboard 26' may alternatively be bonded to an inside surface 27*b* of a second linerboard 24*b'*. In yet another embodiment, a third and fourth linerboard (not shown) are bonded to the inside surfaces 27*a*, 27*b* of the first and second linerboards 24*a'*, 24*b'*, respectively. Bonding the third linerboard 26' between an inside surface of at least one of the first and second linerboards may be desirable so that the third linerboard 26' may be hidden from view, e.g., may not be seen by viewing either the interior or the exterior of the container 10.

The third linerboard 26 may be introduced, applied, and adhered to the container blank 10' using any suitable method. The method of application may depend on the configuration and capabilities of the combining machinery (corrugator) used to form the container blank 10'. Thus the application of the third linerboard 26 to the container blank 10' will likely differ depending on the configuration of the equipment by which the third linerboard 26 is to be applied. In some embodiments (see FIGS. 1-3), the height of the third linerboard 26 will be less than the full height of the container, and, thus, less than the full width of the combining web on the corrugator.

The application of the third linerboard 26 may involve preheating a third linerboard web and/or the web onto which the third linerboard 26 is to be bonded or laminated. The third linerboard 26 may be adhered using aqueous-based adhesives (e.g., modified starch, polyvinyl acetate (PVA)), hot melt adhesive, any other suitable adhesive, or combinations thereof. The materials used to apply the third linerboard may 26 also differ depending on, for example, the configuration and capability of the combining equipment used to form the container blank 10'.

According to one embodiment, a modified starch adhesive may be used to laminate the third linerboard 26 to the corrugated fiberboard 23. Formulation of the adhesive may be modified to increase its performance in wet environments (e.g., "leaker" containers) and/or high humidity environments. Application means may include "full," roll-metered, wire-wound rod, doctor-blade metered, or patterned by anilox roll (e.g., micro-pattern) or a large "printer" (e.g., macro-pattern). The application means may depend upon the performance need and/or the desire to minimize the amount of water or the adhesive vehicle imparted into/onto the laminated structure. The application process may occur as a prelaminating approach (e.g., before a singlefacer) or take place downstream of the singlefacer. Depending on equipment configuration, it may be desirable to preheat and/or pre-dry linerboards to a low moisture content and encourage the starch to gelatinize quickly after linerboard-to-linerboard contact is made. The resulting moisture content of the laminated structure would, thus, be managed to minimize any moisture imbalance in the resulting container blank 10', thereby decreasing the possibility of warp.

Use of a PVA adhesive, either in liquid or foamed-liquid form, is also contemplated. Compared with starch-based adhesives, using a PVA adhesive typically requires a smaller amount of adhesive and generally has a superior performance. However, PVA adhesive is typically more costly. Thus, it may be desirable to apply PVA adhesive in liquid form, where there is generally little or no intentional entrainment of air, such that less than full coverage may be achieved, which would decrease material cost and moisture imparted. The liquid PVA adhesive may be metered-on or printed-on. Alternatively, the PVA adhesive may be extruded in bead or strip applications in interrupted or uninterrupted patterns, for optimization purposes. The application of PVA adhesive may occur as a pre-laminating approach or at the doublebacker section prior to the board being heated and/or compressed and subsequently cooled. In one embodiment, the linerboards are pre-dried to a low moisture content such that bonding and dewatering of the PVA adhesive is accomplished quickly, and the resulting moisture content of the laminated linerboard structure is decreased, thereby assisting in reducing warp of the fully combined container blank 10'.

The third linerboard 26 may also be applied to the corrugated fiberboard 23 using a hot-melt adhesive. The materials that may be used include traditional formulated polymeric blends, unblended polymers (e.g., simple olefins, low-density polyethylene (LDPE)), modified paraffin-based waxes, combinations thereof, or the like. Application may involve premelting the adhesive and then applying it to one or both linerboard surfaces (e.g., the first or second linerboard **24*a*, 24*b* and/or the third linerboard 26**), each typically having been preheated. The hot-melt adhesive may be applied using bead-extrusion, film-extrusion, curtain-coating, sputtered application, roll-metered, doctor-blade metered, printed application, patterned application, combinations thereof, or the like.

Another contemplated method of applying a hot-melt adhesive involves use of roll/web polymers (e.g., LDPE), where the web of thin polymer (e.g., solid form, off a roll) is threaded between the first or second linerboard **24*a*, 24*b* and the third linerboard 26 in the combining process. These linerboards 24*a*, 24*b*, 26** may be pre-dried to low moisture content and preheated to at or above the melting point of the polymer being used. Upon exiting a nip-point, the resulting fully-combined construction may continue to be heated, with or without compression, so as to assure that the polymer melts and bonds to each of the linerboards. Upon cooling (ambient or process), the resulting construction may continue on through the corrugating/combining process.

Other variations of this process are also contemplated, including lamination taking place at varying points on the corrugator. For example, lamination of the third linerboard 26 may occur either early in the process (e.g., pre-laminating), late in the process (e.g., after the third linerboard 26 has been combined with the first or second linerboard **24*a*, 24*b*** and is about to enter the "hot plate" section for final curing/compression and subsequent cooling), or at virtually any point therebetween.

The resulting enhanced thickness of the container blank 10' and the container 10 at the portion having the third linerboard 26 attached thereto assists in reinforcing, containing, and protecting of the container 10. Thus, using the third linerboard 26 of the embodiments of the present invention, the overall strength of the container 10 is increased at a lower cost than using traditional means (e.g., internal and/or external reinforcements or "strapping"). Furthermore, adding a third linerboard 26 may often be accomplished using existing processes, capital equipment, and components typically used to manufacture a single-wall corrugated fiberboard and, thus, may not require significant additional costs (e.g., capital costs) to manufacture.

To assemble the container 10 of FIG. 1 using the container blank 10' of FIG. 2, the side panels **18*a-i* may be formed into an octagonal shape such that the endmost side panels 18*a*, 18*i* are aligned and at least partly overlap with one another. The endmost side panels 18*a*, 18*i*** may then be attached to one another using any suitable attachment method such as using an adhesive.

In the illustrated embodiment, the endmost diagonal bottom panels **16*a*, 16*i* are aligned and at least partly overlap with one another. The diagonal bottom panels 16*a*, 16*i* may then, optionally, be attached to one another using any suitable attachment method such as using an adhesive. Each bottom panel 16*a-i* is then folded along its respective fold line 22*a-h*. In one embodiment, the diagonal bottom panels 16*a*, 16*c*, 16*e*, 16*g*, and 16*i* are folded toward the interior of the container first. Next, the front and back bottom panels 16*b*, 16*f* are similarly folded. Finally, the left and right bottom panels 16*d*, 16*h*** are folded such that the left and right bottom panels

16*d*, 16*h* are in an outermost position. The outer corners of the left and right bottom panels 16*d*, 16*h* may be tucked within openings 32 formed through the front and back bottom panels 16*b*, 16*f*. The bottom panels 16*a-i* may then be secured to one another using any suitable attachment method such as using an adhesive.

The containers of the embodiments described herein may be assembled using any suitable means. For example, it is contemplated that assembly of the containers of the embodiments described herein may be fully (or nearly fully) automated. In one embodiment, for example, a side portion 12 having endmost side panels 18*a*, 18*i* already attached may be brought in through extended glue heads and popped open. An operator may then load the partially-assembled container into a magazine that erects the side portion 12 and folds and secures the bottom panels 16*a-i*, thereby producing a container using a fully automated method.

In another embodiment, the process of forming a container of the embodiments of the present invention is partially automated. In this embodiment, the side portion 12 may be manually erected. A machine may apply adhesive to the bottom panels 16*a-i*. The machine may then fold the bottom panels 16*a-i* upward toward the interior of the container 10 and secure the bottom panels 16*a-i* to one another. Other partially automated processes are also contemplated.

In yet another embodiment, the containers of the embodiments described herein are manually assembled. In this embodiment, the side portion is assembled such that the endmost side panels 18*a,i* are adhered to one another. A fixture insert may then be inserted to maintain the shape of the resulting structure. One or more operators may then fold and secure the bottom panels 16*a-i* to one another.

The container 10 and/or container blank 10' described herein may be formed from a single-wall or a double-wall corrugated fiberboard. Because the reinforcing portion of the containers of the embodiments of the present invention may be formed from a single linerboard, the overall cost of manufacturing such a container is not substantially increased. However, adding the reinforcing third or additional linerboard(s) has substantial benefits, including reducing risk of leakage and/or breakage of the container 10.

Because the addition of the third or additional linerboard(s) of the containers described herein provide enhanced structural integrity to the containers, the use of internal and external strapping may be reduced or eliminated. This is beneficial from manufacturing, cost, recycling, and environmental standpoints.

Figure 4:
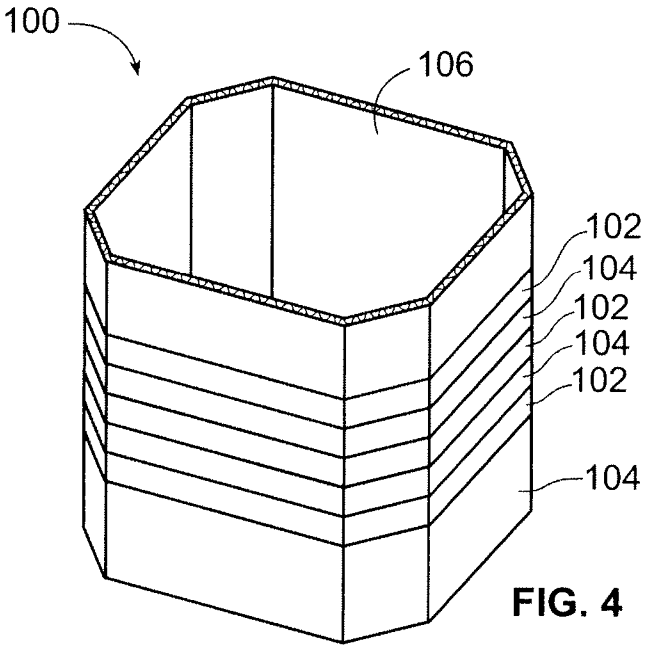
FIG. 4 is an isometric view of a container according to another embodiment of the present invention.

Although not required or necessary, any of the containers of the embodiments of the present invention may, however, include one or more internal or external reinforcements. For example, the containers may include external straps, as shown in FIG. 4. FIG. 4 illustrates a container 100 having reinforcement straps 102. The reinforcement straps 102 may be a single, generally seamless reinforcement strap continuously wound around a periphery of the container 100. Non-limiting examples of materials that may be utilized for the reinforcement straps 102 include reinforced packaging tape, adhesive tape, polymeric film, and stretch-polymeric string. Although in the embodiment of FIG. 4, three reinforcing straps 102 are shown positioned over a third linerboard 104, it is contemplated that any suitable number of reinforcing straps may be used. It is also contemplated that the third linerboard may be positioned on the internal facing 106 of the container 100.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A container comprising:

a side portion including a plurality of side panels; and a bottom portion including a plurality of bottom panels, each of the plurality of bottom panels extending from a respective one of the plurality of sides;

wherein the container includes a first linerboard, a second linerboard, at least one corrugated medium positioned between the first and second linerboards, and at least one additional linerboard being directly adjacent to at least a portion of the first linerboard, the at least one additional linerboard forming at least one of an exposed innermost or outermost surface of the container, a height of the at least one additional linerboard being less than the height of the container.

2. The container of claim 1, wherein the at least one additional linerboard is coupled to a lower portion of the container.

3. The container of claim 2, wherein the at least one additional linerboard is coupled to at least a portion of the plurality of bottom panels.

4. The container of claim 1, wherein the side portion and the bottom portion are formed from single-wall corrugated fiberboard.

5. The container of claim 1, wherein the at least one additional linerboard is formed from spunbonded olefin material.

6. The container of claim 1, wherein each of the first, second, and at least one additional linerboard is formed of fiber material.

7. The container of claim 1, wherein the at least one additional linerboard is a plurality of linerboards directly bonded to one another.

8. A container comprising:

a side portion including a plurality of side panels;

a bottom portion including a plurality of bottom panels extending from a respective one of the plurality of sides; and wherein the container includes a first linerboard, a second linerboard, at least one corrugated medium positioned between the first and second linerboards, and a third linerboard directly adjacent to the first linerboard, the third linerboard extending from the side portion to the bottom portion, the third linerboard forming at least one of an exposed innermost or outermost surface of the container, a height of the third linerboard being less than the height of the container.

9. The container of claim 8, wherein the third linerboard is formed from spunbonded olefin material.

10. The container of claim 8, further comprising one or more additional linerboards bonded to at least a portion of at least one of the third linerboard.

11. The container of claim 8, wherein each of the first, second, and third linerboard is formed of fiber material.

12. A container comprising:

a side portion including a plurality of side panels; and a bottom portion including a plurality of bottom panels, each of the plurality of bottom panels extending from a respective one of the plurality of sides;

wherein the container includes a first linerboard, a second linerboard, a corrugated medium layer positioned between the first and second linerboard, and at least one additional linerboard adjacent to the first linerboard, the amount of linerboards being greater than twice the amount of corrugated medium layers, a height of the at least one additional linerboard being less than the height of the container, wherein the at least one additional linerboard forms at least one of an exposed innermost or outermost surface of the container.

13. The container of claim 12, wherein the at least one additional linerboard is a plurality of linerboards directly bonded to one another.

14. The container of claim 12, wherein the at least one additional linerboard is coupled to a lower portion of the container.

15. The container of claim 14, wherein the at least one additional linerboard is coupled to at least a portion of the plurality of bottom panels.

16. The container of claim 12, wherein the amount of corrugated medium layers is one and the amount of linerboards is three or more.

17. The container of claim 12, wherein each of the first, second, and at least one additional linerboard is formed of fiber material.

* * * * *